US011886487B2

(12) United States Patent
Maze et al.

(10) Patent No.: US 11,886,487 B2
(45) Date of Patent: Jan. 30, 2024

(54) METHOD, DEVICE, AND COMPUTER PROGRAM FOR ENCAPSULATING MEDIA DATA INTO A MEDIA FILE

(71) Applicant: CANON KABUSHIKI KAISHA, Tokyo (JP)

(72) Inventors: Frédéric Maze, Langan (FR); Franck Denoual, Saint Domineuc (FR); Naël Ouedraogo, Val d'Anast (FR); Jean Le Feuvre, Gometz-le-Chatel (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/346,053

(22) Filed: Jun. 11, 2021

(65) Prior Publication Data

US 2021/0390131 A1    Dec. 16, 2021

(30) Foreign Application Priority Data

Jun. 16, 2020  (GB) .................................... 2009168
Jun. 24, 2020  (GB) .................................... 2009667

(51) Int. Cl.
*G06F 16/45*    (2019.01)
*G06F 16/11*    (2019.01)
(Continued)

(52) U.S. Cl.
CPC ............ *G06F 16/45* (2019.01); *G06F 16/116* (2019.01); *G06F 16/41* (2019.01); *H04N 19/188* (2014.11); *H04N 19/46* (2014.11)

(58) Field of Classification Search
CPC ........ G06F 16/45; G06F 16/116; G06F 16/41; H04N 19/188; H04N 19/46; H04N 21/8451; H04N 21/85406; H04N 21/845
(Continued)

(56) References Cited

U.S. PATENT DOCUMENTS

2004/0006575 A1*  1/2004  Visharam ......... H04N 21/23424
2004/0109009 A1*  6/2004  Yonezawa ............. G06T 19/006
                                                          345/632
(Continued)

FOREIGN PATENT DOCUMENTS

GB      2516825 A    2/2015
GB      2546027 A    7/2017
(Continued)

OTHER PUBLICATIONS

Amon et al., "File Format for Scalable Video Coding", IEEE Transactions of Circuits and Systems for Video Technology, vol. 17, No. 9, Sep. 2007, pp. 1174-1185. (Year: 2007).*

(Continued)

*Primary Examiner* — Phuong Thao Cao
(74) *Attorney, Agent, or Firm* — Canon U.S.A., Inc. IP Division

(57) ABSTRACT

The invention relates to a method of generating a media file, the method comprising: generating a first data structure assigning a subset of samples or subsamples of a track to one or more sample groups; generating a second data structure comprising data for describing each of the one or more sample groups, the first data structure comprising a first grouping type and the second data structure comprising a second grouping type, wherein the second data structure comprises data for indicating whether the data for describing each of the one or more sample groups is invariant along time or not; and generating a media file including the samples, and the first and second data structures

21 Claims, 8 Drawing Sheets

(51) Int. Cl.
　　*G06F 16/41*　　(2019.01)
　　*H04N 19/169*　　(2014.01)
　　*H04N 19/46*　　(2014.01)

(58) Field of Classification Search
　　USPC ........................................................ 707/740
　　See application file for complete search history.

(56) References Cited

U.S. PATENT DOCUMENTS

| | | | | |
|---|---|---|---|---|
| 2004/0167925 | A1* | 8/2004 | Visharam | H04N 21/8451 |
| 2009/0228632 | A1* | 9/2009 | Murayama | G06F 3/0685 |
| | | | | 711/E12.001 |
| 2013/0185756 | A1* | 7/2013 | Frojdh | H04N 21/44008 |
| | | | | 725/88 |
| 2016/0232233 | A1* | 8/2016 | Hendry | H04N 19/70 |
| 2016/0255381 | A1* | 9/2016 | Denoual | H04N 21/440227 |
| | | | | 709/231 |
| 2016/0373771 | A1* | 12/2016 | Hendry | H04N 19/70 |
| 2017/0111650 | A1* | 4/2017 | Hendry | H04N 19/593 |
| 2017/0347109 | A1* | 11/2017 | Hendry | H04N 19/96 |
| 2018/0184098 | A1* | 6/2018 | Denoual | H04N 19/587 |
| 2018/0199071 | A1* | 7/2018 | Wang | H04N 21/2353 |
| 2019/0014162 | A1* | 1/2019 | Denoual | H04L 65/65 |
| 2019/0158935 | A1* | 5/2019 | Denoual | H04N 19/174 |
| 2020/0014905 | A1* | 1/2020 | Oh | H04N 21/8456 |
| 2020/0245041 | A1* | 7/2020 | Maze | H04N 21/2353 |

FOREIGN PATENT DOCUMENTS

| | | | | |
|---|---|---|---|---|
| GB | 2550604 | A | | 11/2017 |
| GB | 2551296 | A | | 12/2017 |
| WO | 2019/072795 | A1 | | 4/2019 |
| WO | WO-2019072795 | A1 * | 4/2019 | ......... H04N 21/2353 |
| WO | WO-2019193251 | A1 * | 10/2019 | ......... H04N 21/2353 |
| WO | WO-2020013454 | A1 * | 1/2020 | ............ F25D 21/008 |

OTHER PUBLICATIONS

Schierl et al., "System Layer Integration of High Efficiency Video Coding", IEEE Transactions on Circuits and Systems for Video Technology, vol. 22, No. 12, Dec. 2012, pp. 1871-1884. (Year: 2012).*

Jean Le Feuvre, et al., Default Sample Group Descriptions in ISOBMFF, International Organisation for Standardisation, Coding of Moving Pictures and Audio, ISO/IEC JTC1/SC29/WG11 MPEG2013/M30292, Vienna, AT, Jul. 2013.

* cited by examiner

METHOD, DEVICE, AND COMPUTER PROGRAM FOR ENCAPSULATING MEDIA DATA INTO A MEDIA FILE

CROSS REFERENCE TO RELATED APPLICATION

This application claims the benefit under 35 U.S.C. § 119(a)-(d) of United Kingdom Patent Application No. 2009168.2, filed on Jun. 16, 2020 and entitled "METHOD, DEVICE, AND COMPUTER PROGRAM FOR ENCAPSULATING MEDIA DATA INTO A MEDIA FILE", and United Kingdom Patent Application No. 2009667.3, filed on Jun. 24, 2020 and entitled "METHOD, DEVICE, AND COMPUTER PROGRAM FOR ENCAPSULATING MEDIA DATA INTO A MEDIA FILE". The above cited patent applications are incorporated herein by reference in their entirety.

FIELD OF THE INVENTION

The present invention relates to methods and devices for encapsulating and transmitting media data.

BACKGROUND OF THE INVENTION

The International Standard Organization Base Media File Format (ISO BMFF, ISO/IEC 14496-12) is a well-known flexible and extensible file format that encapsulates and describes encoded timed or non-timed media data either for local storage or for transmission via a network or via another bitstream delivery mechanism. An example of extensions is ISO/IEC 14496-15 that describes encapsulation tools for various NAL (Network Abstraction Layer) unit-based video encoding formats. Examples of such encoding formats are AVC (Advanced Video Coding), SVC (Scalable Video Coding), HEVC (High Efficiency Video Coding), L-HEVC (Layered HEVC) and VVC (Versatile Video Coding). Another example of file format extension is ISO/IEC 23008-12 that describes encapsulation tools for still images or sequence of still images such as HEVC Still Image. Another example of file format extension is ISO/IEC 23090-2 that defines the omnidirectional media application format (OMAF). The ISO Base Media file format is object-oriented. It is composed of building blocks called boxes corresponding to data structures characterized by a unique type identifier, typically a four-characters code, also noted FourCC or 4CC. Full boxes are data structures similar to boxes comprising in addition a version and flags value attributes. In the following, the term box may designate both full boxes or boxes. Those boxes or full boxes are hierarchically or sequentially organized in the ISOBMFF file and define parameters describing the encoded timed or non-timed media data, its structure and timing, if any. All data in an encapsulated media file (media data and metadata describing the media data) is contained in boxes. There is no other data within the file. File-level boxes are boxes that are not contained in other boxes.

In the file format, the overall media presentation is called a movie. The movie is described by a movie box (with the four-character code 'moov') at the top level of the file. This movie box represents an initialization information container containing a set of various boxes describing the media presentation. It is logically divided into tracks represented by track boxes (with the four-character code 'trak'). Each track (uniquely identified by a track identifier (track_ID)) represents a timed sequence of media data belonging to the presentation (frames of video or audio samples, for example). Within each track, each timed unit of data is called a sample; this might be a frame of video, audio or timed metadata. Samples are implicitly numbered in decoding order sequence. Each track box contains a hierarchy of boxes describing the samples of a track, e.g. a sample table box ('stbl') contains all the time and data indexing of the media samples in a track. The actual sample data are stored in boxes called Media Data Boxes (with the four-character code 'mdat') or Identified Media Data Boxes (with the four-character code 'imda', similar to the Media Data Box but containing an additional identifier) at the same level as the movie box. The movie may also be fragmented and organized temporally as a movie box containing information for the whole presentation followed by a list of media fragments, i.e., a list of couple movie fragment and Media Data boxes ('mdat' or 'imda'). Within a movie fragment (box with the four-character code 'moof') there is a set of track fragments (box with the four-character code 'traf') describing the tracks within the media fragment, zero or more per movie fragment. The track fragments in turn contain zero or more track run boxes ('trun'), each of which document a contiguous run of samples for that track fragment.

An ISOBMFF file may contain multiple encoded timed media data or sub-parts of encoded timed media data forming multiple tracks. When sub-parts correspond to one or successive spatial parts of a video source, taken over the time (e.g. at least one rectangular region, sometimes called 'tile' or 'sub-picture', taken over the time), the corresponding multiple tracks may be called tile tracks or sub-picture tracks.

ISOBMFF and its extensions comprise several grouping mechanisms to group together tracks, static items, or samples and associate a group description with them. A group typically shares common semantic and/or characteristics.

The inventors have noticed several problems when describing and signaling information about the media data to transmit, in particular for describing group of samples or group of NAL units within samples.

An example involves reducing the cost of the signaling of a group of samples that is invariant along time.

Another example concerns optimizing the signaling of NAL unit characteristics.

The existing solutions are either complex or not well defined.

SUMMARY OF THE INVENTION

The present invention has been devised to address one or more of the foregoing concerns.

According to a first aspect of the invention, it is provided a method of generating a media file, the method comprising:
  generating a first data structure assigning a subset of samples or subsamples of a track to one or more sample groups;
  generating a second data structure comprising data for describing each of the one or more sample groups, the first data structure comprising a first grouping type and the second data structure comprising a second grouping type, wherein the second data structure comprises data for indicating whether the data for describing each of the one or more sample groups is invariant along time or not; and
  generating a media file including the samples, and the first and second data structures.

According to an embodiment, the first and second grouping type indicate a same type of sample groups.

According to an embodiment:
the data for indicating whether the data for describing each of the one or more sample groups is invariant along time or not is a flag;
when the flag is set, it indicates that the first data structure comprises a single set of property values that applies to all the track samples of the track.

According to an embodiment, the data for indicating whether the data for describing each of the one or more sample groups is invariant along time or not is defined by:
a grouping type of the second data structure and default group description index; and
when the grouping type value is set to a predetermined grouping type and the default group description index is greater than zero, then the second data structure is determined as invariant along time.

According to an embodiment:
the data for indicating whether the data for describing each of the one or more sample groups is invariant along time or not comprises a two bits flag;
a first flag value indicates that the second data structure comprises a single set of property values that applies to all the track samples of the track;
a second flag value indicates that the second data structure is invariant along time while the samples or subsamples composing the group may vary over time.

According to an embodiment:
a third flag value indicates that the second data structure is invariant along time while a default sample group mapping may vary over time.

According to another aspect of the invention, it is provided a method of generating a media file, the method comprising:
generating a first data structure assigning a subset of samples or subsamples of a track to one or more sample groups; and
generating a media file including the samples, and the first data structure;
wherein:
the first data structure comprises data indicating that the one or more sample groups are virtual.

According to an embodiment:
a grouping type value in the first data structure identifies a property;
an index of a set of property values in the first data structure comprises a set of property values for the identified property.

According to an embodiment, the data indicating that the one or more sample groups are virtual is the grouping type value.

According to an embodiment, the data indicating that the one or more sample groups are virtual is a parameter within the data structure.

According to an embodiment, the method further comprises:
generating a second data structure comprising data for describing each of the one or more sample groups;
wherein:
each sample of the subset comprises one or more NAL units;
the first and second data structure comprises a same grouping type value indicating a mapping between a subset of samples and sample groups describing groups of one or more NAL units;
a grouping type parameter value in the first data structure identifies a property;
a group identifier value in data describing each group of one or more NAL units in the second data structure comprises a set of property values for the identified property.

According to an embodiment, the data indicating that the one or more sample groups are virtual is the grouping type parameter value.

According to an embodiment, the data indicating that the one or more sample groups are virtual is a flag of the first data structure.

According to another aspect of the invention, it is provided a computer program product for a programmable apparatus, the computer program product comprising a sequence of instructions for implementing a method according to the invention, when loaded into and executed by the programmable apparatus.

According to another aspect of the invention, it is provided a computer-readable storage medium storing instructions of a computer program for implementing a method according to the invention.

According to another aspect of the invention, it is provided a computer program which upon execution causes the method of the invention to be performed.

According to another aspect of the invention, it is provided a device for generating a media file, the device comprising a processor configured for:
generating a first data structure assigning a subset of samples or subsamples of a track to one or more sample groups;
generating a second data structure comprising data for describing each of the one or more sample groups, wherein the second data structure comprises data for indicating whether the data for describing each of the one or more sample groups is invariant along time or not; and
generating a media file including the samples, and the first and second data structures.

According to another aspect of the invention, it is provided a device for generating a media file, the device comprising a processor configured for:
generating a first data structure assigning a subset of samples or subsamples of a track to one or more sample groups; and
generating a media file including the samples, and the first data structure;
wherein:
the first data structure comprises data indicating that the one or more sample groups are virtual.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention are described below, by way of examples only, and with reference to the following drawings in which.

DETAILED DESCRIPTION OF EMBODIMENTS OF THE INVENTION

Figure 1:
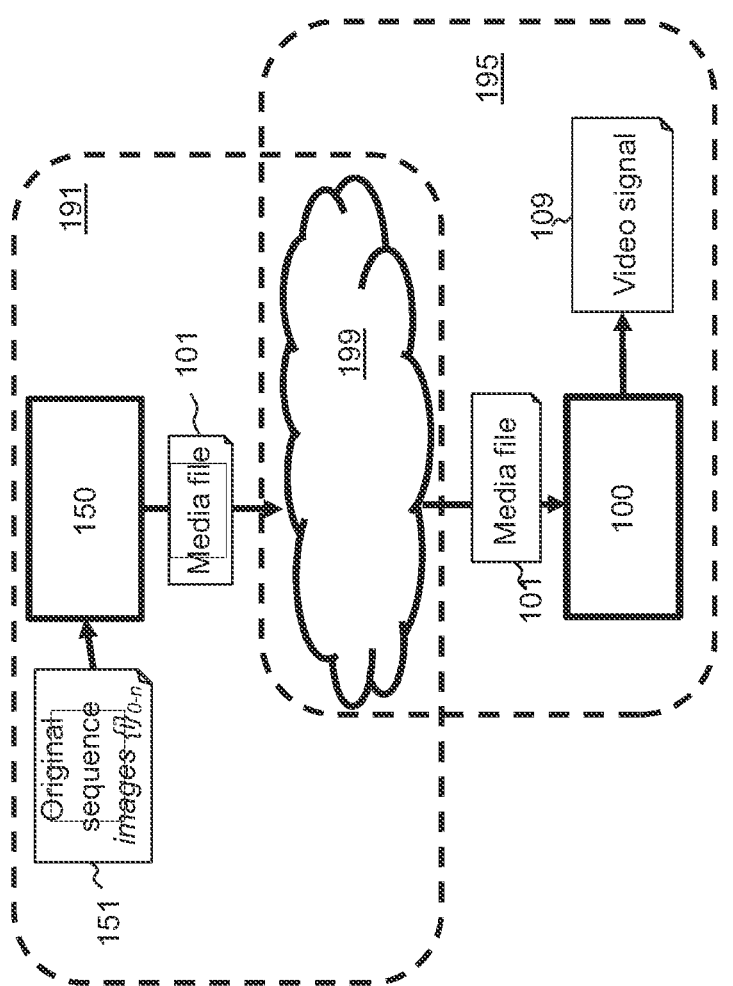
FIG. 1 illustrates exemplary systems comprising encapsulation/de-encapsulation modules adapted to embody embodiments of the present invention.

FIG. 1 illustrates exemplary systems 191 and 195 adapted to embody embodiments of the present invention. The system 191 comprises an encapsulation module 150 connected to a communication network 199. The system 195 comprises a de-encapsulation module 100 connected to the communication network 199.

According to an embodiment, the system 191 is for processing a content, e.g. video, still image and/or audio content, for streaming or storage. The system 191 obtains/receives a content comprising an original non-timed set or timed sequence of images 151, encodes the non-timed set of images or timed sequence of images using a media encoder (e.g. image or video encoder) into encoded media data, and encapsulates the encoded media data in a media file 101 using the encapsulation module 150. The encapsulation module 150 comprises at least one of a writer or a packager to encapsulate the encoded media data. The media encoder may be implemented within the encapsulation module 150 to encode the received content, or it may be separate from the encapsulation module 150. The encapsulation module 150 can thus be dedicated only for encapsulating already encoded content (encoded media data). The encoding step is optional, encoded media data may correspond to raw media data.

The encapsulation module 150 may generate a plurality of media files 101. This plurality of media file may correspond to alternative version of the media content and/or successive fragments of the media content.

According to an embodiment, the system 195 is for processing encapsulated encoded media data for displaying/outputting to a user. The system 195 obtains/receives a media file 101 via the communication network 199 or by reading a storage mean, de-encapsulates the media file 101 to retrieve encoded media data using a de-encapsulation module 100, and decodes the encoded media data into an audio and/or video content (signal) using a media decoder. The de-encapsulation module 100 comprises at least one of a parser or player. The media decoder may be implemented within the de-encapsulation module 100 to decode the encoded media data, or it may be separate from the de-encapsulation module 100.

The media file 101 is communicated to the parser or player of module 100 in a number of ways, for example it may be generated in advance by the writer or packager of encapsulation module 150 and stored as data in a remote storage apparatus in the communication network 199 (e.g. on a server or a cloud storage) or a local storage apparatus until a user requests the content encoded therein from the remote or local storage apparatus. Upon requesting the content, the data is read/communicated/streamed to the de-encapsulation module 100 from the storage apparatus.

The system 191 may also comprise a content providing apparatus for providing/streaming content information to the user for the content stored in the storage apparatus (e.g. content information may be described via a manifest file including the title of the content and other descriptive metadata and storage location data for identifying, selecting and requesting the content). The content providing apparatus may also be adapted for receiving and processing a user request for a content to be delivered/streamed from the storage apparatus to the user terminal.

Alternatively, the encapsulation module 150 may generate the media file 101 and communicates/streams it directly to the de-encapsulation module 100 as and when the user requests the content. The de-encapsulation module 100 then receives the media file 101 and performs the de-encapsulating and the decoding of media data according to embodiments of the invention to obtain/generate a video signal 109 and/or audio signal, which is then used by a user terminal to provide the requested content to the user.

The user has access to the audio/video content (signal) through a user interface of a user terminal comprising the module 100 or a user terminal that has means to communicate with the module 100. Such a user terminal may be a computer, a mobile phone, a tablet or any other type of device capable of providing/displaying the content to the user.

According to one implementation, the media file 101 encapsulates encoded media data (e.g. encoded audio or video) into boxes according to ISO Base Media File Format (ISOBMFF, ISO/IEC 14496-12 and ISO/IEC 14496-15 standards). The media file 101 may correspond to one single media file (prefixed by a FileTypeBox 'ftyp') or one media file (prefixed by a FileTypeBox 'ftyp') followed by one or more segment files (possibly prefixed by a SegmentTypeBox 'styp'). According to ISOBMFF, the media file (and segment files when present) 101 may include two kinds of boxes; "media data" boxes ('mdat' or 'imda') containing the media data and "metadata boxes" ('moov' or 'moof' or 'meta' box hierarchy) containing the metadata defining placement and timing of the media data.

An image or video encoder encodes image or video content using an image or video standard to generate encoded media data. For instance, Image or Video coding/decoding (codecs) standards include ITU-T H.261, ISO/IEC MPEG-1 Visual, ITU-T H.262 (ISO/IEC MPEG-2 Visual), ITU-T H.263 (ISO/IEC MPEG-4 Visual), ITU-T H.264 (ISO/IEC MPEG-4 AVC), including its scalable video coding (SVC) and multi-view video coding (MVC) extensions, ITU-T H.265 (HEVC), including its scalable (SHVC) and multi-view (MV-HEVC) extensions.

Embodiments described herein mostly describe examples using the VVC standard currently under development (also known as ITU-T H.VVC, ISO/IEC MPEG-I VVC and Versatile Video Coding). However, the techniques and systems described herein may also be applicable to other coding standards already available, such as HEVC, or not yet available or developed.

Figure 2:
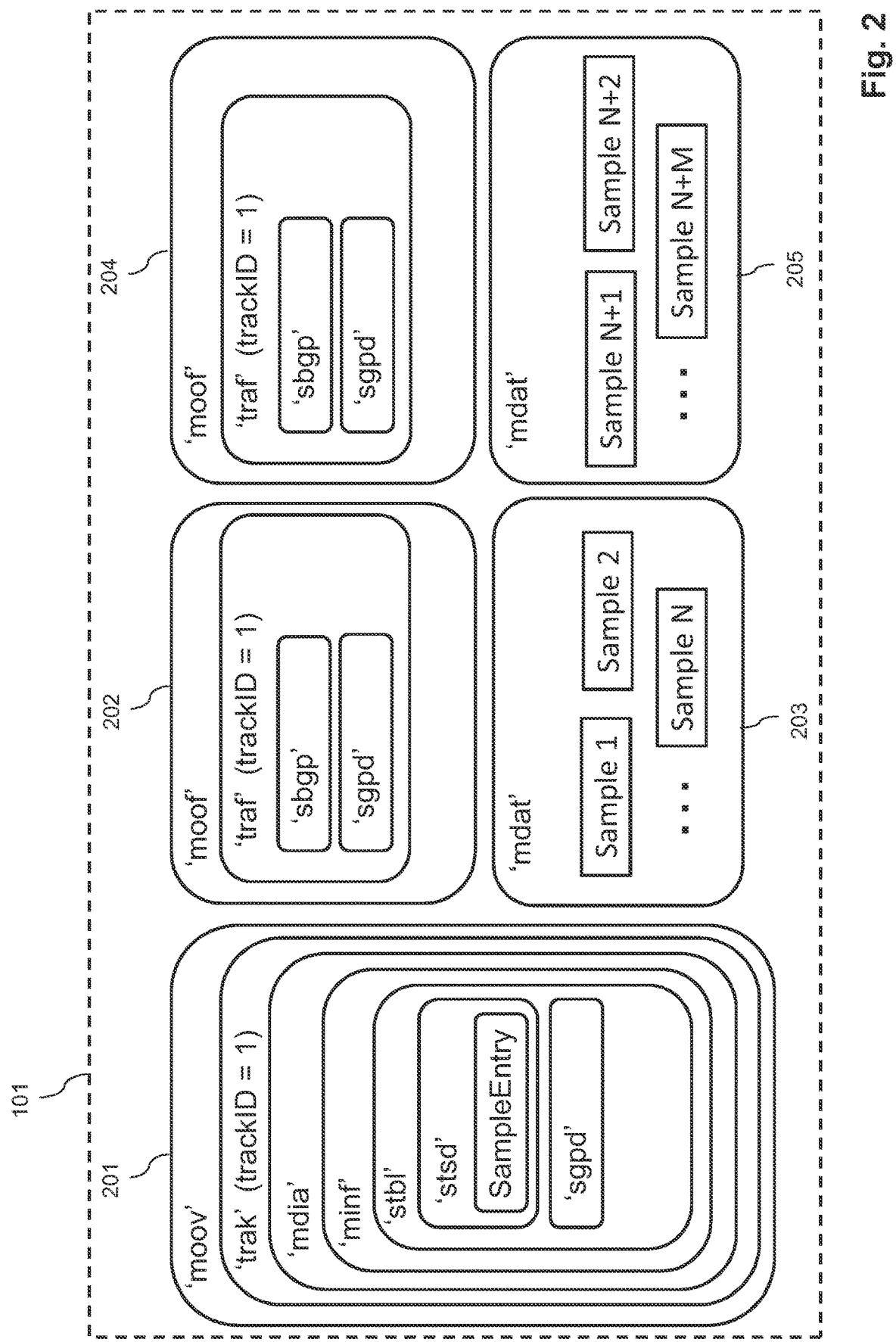
FIG. 2 illustrates a structure example of a fragmented media file according to ISO Base Media File Format.

FIG. 2 illustrates an example of media file 101 temporally organized as a fragmented media file according to ISO Base Media File Format.

The media file 101 starts with a FileTypeBox 'ftyp' (not represented) followed by a movie box ('moov') 201. The movie box provides a description of the media file content, the number of tracks and information on their respective timelines and characteristics, e.g. one track with trackID equal to 1. The movie box 201 is followed by one or more media fragments, e.g.; a first media fragment containing and describing the sample 1 to sample N of the track with trackID equal to 1. This first media fragment is composed of a MovieFragmentBox ('moof') 202 and a Media Data box ('mdat') 203, and a second media fragment containing and describing the sample N+1 to sample N+M of the track with trackID equal to 1. This second media fragment is composed of the movie fragment box ('moof') 204 and Media Data box ('mdat') 205.

Among other information, a TrackBox ('trak') in the MovieBox ('moov') contains in its box hierarchy a SampleTableBox ('stbl') containing descriptive and timing information of the media samples in the track. In particular, it contains a SampleDescriptionBox ('stsd') containing one or more SampleEntry box giving detailed information about the coding type used by a sample, and any initialization information needed for that coding or decoding. For instance, a SampleEntry box with a Four-character type 'vvc1' or 'vvi1' signals that associated samples contains media data encoded according to the VVC format, or a SampleEntry box with a Four-character type 'hvc1' or 'hev1' signals that associated samples contains media data encoded according to HEVC format. The SampleEntry box may contain other boxes containing information that apply to all samples associated with this SampleEntry box. Samples are associated with a SampleEntry via the sample_description_index parameter either in a SampleToChunkBox ('stsc') in the SampleTableBox ('stbl') when the media file is a non-fragmented media file or in a TrackFragmentHeaderBox ('tfhd') in a TrackFragmentBox ('traf') of the MovieFragmentBox ('moof') when the media file is fragmented. Even if SampleEntries may be used to change information associated with samples over time, it only provides very coarse-grained granularity and does not allow changing information per sample or per non-continuous group of samples, and its usage is very limited in practice because it generally requires a reset of the decoder due to changes in decoder configuration parameters contained in the SampleEntry.

ISOBMFF and its extensions comprise another grouping mechanism dedicated to group of samples. The sample grouping mechanism can be used to indicate that certain properties associated with an indicated grouping type or semantic apply to an indicated group of samples within a track.

The sample grouping mechanism allows certain properties corresponding to an indicated grouping type to be associated with a group of samples within a track.

This mechanism relies on the use of two boxes:

- a SampleToGroupBox ('sbgp') that describes the assignment of each sample to a sample group and its sample group description and
- a SampleGroupDescriptionBox ('sgpd') that describes common properties of samples within a particular sample group. The SampleGroupDescriptionBox ('sgpd') contains a list of SampleGroupEntry (VisualSampleGroupEntry for video content), each instance of SampleGroupEntry providing different values for the common properties defined for a particular sample group (identified by its 'grouping_type').

A particular type of sample grouping is defined by the combination of one SampleToGroupBox and one SampleGroupDescriptionBox via a type field ('grouping_type').

Multiple sample grouping instances (i.e. pair of SampleToGroupBox and SampleGroupDescriptionBox) may exist based on different grouping_type values (corresponding to different grouping criteria).

The SampleToGroupBox is defined as follows:

```
Box Type:      'sbgp'
Container:     SampleTableBox ('stbl') or TrackFragmentBox ('traf')
Mandatory:     No
Quantity:      Zero or One
aligned(8) class SampleToGroupBox
   extends FullBox('sbgp', version, 0)
{
   unsigned int(32) grouping_type;
   if (version == 1) {
      unsigned int (32) grouping_type_parameter;
   }
   unsigned int(32) entry_count;
   for (i=1; i <= entry_count; i++)
   {
      unsigned int(32) sample_count;
      unsigned int(32) group_description_index;
   }
}
```

Where grouping_type identifies the type (i.e. the criterion used to form the sample groups) of the sample grouping and links it to its sample group description table with the same value for grouping type.

grouping_type_parameter is an indication of the sub-type of the grouping sample_count indicates the number of consecutive samples associated with a sample group entry in this group.

group_description_index gives the index in the associated SampleGroupDescriptionBox of the sample group entry which describes the samples in this group. The value 0 indicates that this sample is a member of no group of this type.

The SampleGroupDescriptionBox is defined as follows:

```
Box Type:      'sgpd'
Container:     SampleTableBox ('stbl') or TrackFragmentBox ('traf')
Mandatory:     No
Quantity:      Zero or more, with exactly one for each grouping_type in
a SampleToGroupBox
aligned(8) class SampleGroupDescriptionBox (unsigned int(32)
handler_type)
   extends FullBox('sgpd', version, 0) {
   unsigned int(32) grouping_type;
   if (version>=1) { unsigned int(32) default_length; }
   if (version>=2) {
      unsigned int(32) default_group_description_index;
   }
   unsigned int(32) entry_count;
   int i;
   for (i = 1 ; i <= entry_count ; i++) {
      if (version>=1) {
         if (default_length==0) {
            unsigned int(32) description_length;
         }
      }
      SampleGroupDescriptionEntry (grouping_type);
      // an instance of a class derived from
SampleGroupDescriptionEntry
      // that is appropriate and permitted for the media type
   }
}
```

Where grouping_type identifies the type (i.e. the criterion used to form the sample groups) of the sample grouping and links it to its SampleToGroupBox with the same value for grouping type.

default_length indicates the length of every group entry (if the length is constant), or zero (0) if it is variable.

entry_count indicates the number of entries in the following table.

description_length indicates the length of an individual group entry, in the case it varies from entry to entry and default_length is therefore 0

SampleGroupDescriptionEntry is the data structure containing the set of parameters (i.e. properties or property values) that characterizes a group of samples of type grouping_type (e.g. a structure inherited from VisualSampleGroupEntry for video content).

When the version of the box is superior or equal to 2, SampleGroupDescriptionBox contains an additional parameter default_group_description_index. This parameter specifies the index of the sample group description entry which applies to all samples in the track for which no sample to group mapping is provided through a SampleToGroupBox. The default value of this field is zero (indicating that the samples are mapped to no group description of this type). This allows assigning samples to an entry of a sample group description with a given grouping_type by default without defining an associated SampleToGroupBox with a same grouping_type. This mechanism is also known as default sample grouping. This is useful to reduce the signaling cost when all or almost all samples share the same set of property values.

In a fragmented media file 101, the initial list of SampleGroupDescriptionEntry for each sample grouping type can be defined in the SampleTableBox ('stbl') of the MovieBox ('moov') by defining a SampleGroupDescriptionBox ('sgpd') for each grouping_type value. When needed (i.e. there is no default sample grouping), sampleToGroupBoxes providing the mapping of samples with group description entries are defined in TrackFragmentBox ('traf') in MovieFragment ('moof') of each media fragment 202 and 204.

Additional SampleGroupDescriptionBox ('sgpd') may also be defined in each media fragment to update along time the list of available SampleGroupDescriptionEntry fora given grouping_type. This means that if a default sample grouping is defined in the MovieBox ('moov'), it is possible to update this default sample grouping assignment for each media fragment.

As described above, the sample grouping mechanism allows assigning properties to group of samples along time with a very flexible granularity, i.e. per media fragment, per default to all samples not explicitly associated with a SampleGroupDescriptionEntry by a SampleToGroupBox for a given grouping_type, per sample, per group of samples (both for continuous or discontinuous sequence of samples).

It would be advantageous to be able to signal properties of samples that may be either static or dynamic along time depending on the properties of the encapsulated media data content.

As an example, the VVC file format under specification ("w19278—ISO/IEC 14496-15 5$^{th}$ edition Amendment 2 on Carriage of VVC and EVC in ISOBMFF") proposes to signal the identifiers (IDs) of VVC subpictures carried inside samples of a VVC track or VVC subpicture track. For this purpose, two data structures are defined:
- an optional box SubpicPropertiesBox ('supp') contained in sample entries VvcSampleEntry or VvcSubpicSampleEntry, Or
- using a sample group with the grouping type 'spid', and defining a new SampleGroupDescriptionEntry (VvcSubpicIDEntry) inherited from VisualSampleGroupEntry).

The SubpicPropertiesBox is defined as follows:

```
class SubpicPropertiesBox extends FullBox('supp', 0, 0) {
    unsigned int(8) num_subpics_minus1;
    for (i = 0; i <= num_subpics_minus1; i++)
        unsigned int(16) subpic_id;
}
``` where subpic_id specifies the subpicture identifier of the sequence of subpictures contained in the VVC subpicture track.

Similarly, the VvcSubpicIDEntry is defined as follows:

```
aligned(8) class VvcSubpicIDEntry( ) extends
VisualSampleGroupEntry('spid')
{
    unsigned int(8) num_subpics_minus1;
    for (i = 0; i <= num_subpics_minus1; i++)
        unsigned int(16) subpic_id;
}
``` where subpic_id for loop counter i specifies the i-th subpicture identifier, in decoding order, contained in the sample mapped to this sample group description entry.

The former structure defined in a SampleEntry (subpicPropertiesBox) is intended to signal a static configuration and the latter structure defined as a sample grouping (VvcSubpicIDEntry) is intended to signal a dynamic configuration that may change over time.

Such definition is sub-optimal because it requires defining similar data structures located in different places in the media file and it requires from a parser to check multiple data structures to determine whether the signalling of this sample property (i.e. the list of subpicture IDs) is provided in the media file and whether this configuration is static or dynamic along time.

Although the default sample grouping mechanism with no sample group mapping (i.e. no SampleToGroupBox) would allow assigning a set of property values to all samples of a track per default, it cannot express in the fragmented media file case a guarantee that the default will never change along time (e.g. at next media fragment).

A first aspect of the invention is to address above limitations.

According to a first embodiment illustrated in FIG. 4, the SampleGroupDescriptionBox 401 is modified to authorize the definition of box's flags as follows:

```
Box Type:     'sgpd'
Container:    SampleTableBox ('stbl') or TrackFragmentBox ('traf')
Mandatory:    No
Quantity:     Zero or more, with exactly one for each grouping_type in
a SampleToGroupBox
aligned(8) class SampleGroupDescriptionBox (unsigned int(32)
handler_type)
    extends FullBox('sgpd', version, flags) {
    unsigned int(32) grouping_type;
    if (version>=1) { unsigned int(32) default_length; }
    if (version>=2) {
        unsigned int(32) default_group_description_index;
    }
    unsigned int(32) entry_count;
    int i;
    for (i = 1 ; i <= entry_count ; i++) {
        if (version>=1) {
            if (default_length==0) {
                unsigned int(32) description_length;
            }
        }
    }
    SampleGroupDescriptionEntry (grouping_type);
    // an instance of a class derived from
```

```
SampleGroupDescriptionEntry
    // that is appropriate and permitted for the media type
    }
}
``` where the semantic of syntax elements is the same as previous semantic.

In addition, a new flags value 402 is defined as follows:

sample_group_static: indicates that this sample group is restricted to be static and never modified. The flag value is 0x000001. When this flag is set, a single entry shall be present in the sample group description, no sample to group box shall be present in this track or subsequent track fragments, and every sample in the track or subsequent track fragments is associated with the only defined sample group description entry. If a SampleGroupDescriptionBox with the same grouping_type is defined in subsequent track fragments, it shall have exactly the same BoxPayload.

It means that the properties defined in the single entry defined in the SampleGroupDescriptionBox 403 is invariant along time and applies statically to all samples in the track.

Hence when the flag sample_group_static is set the parser or reader is guaranteed that the default is invariant along time and will never change along time, and if it happens the parser or reader may handle the media file as a non-conformant file and raise an error, or alternatively it may ignore changes.

Figure 4:
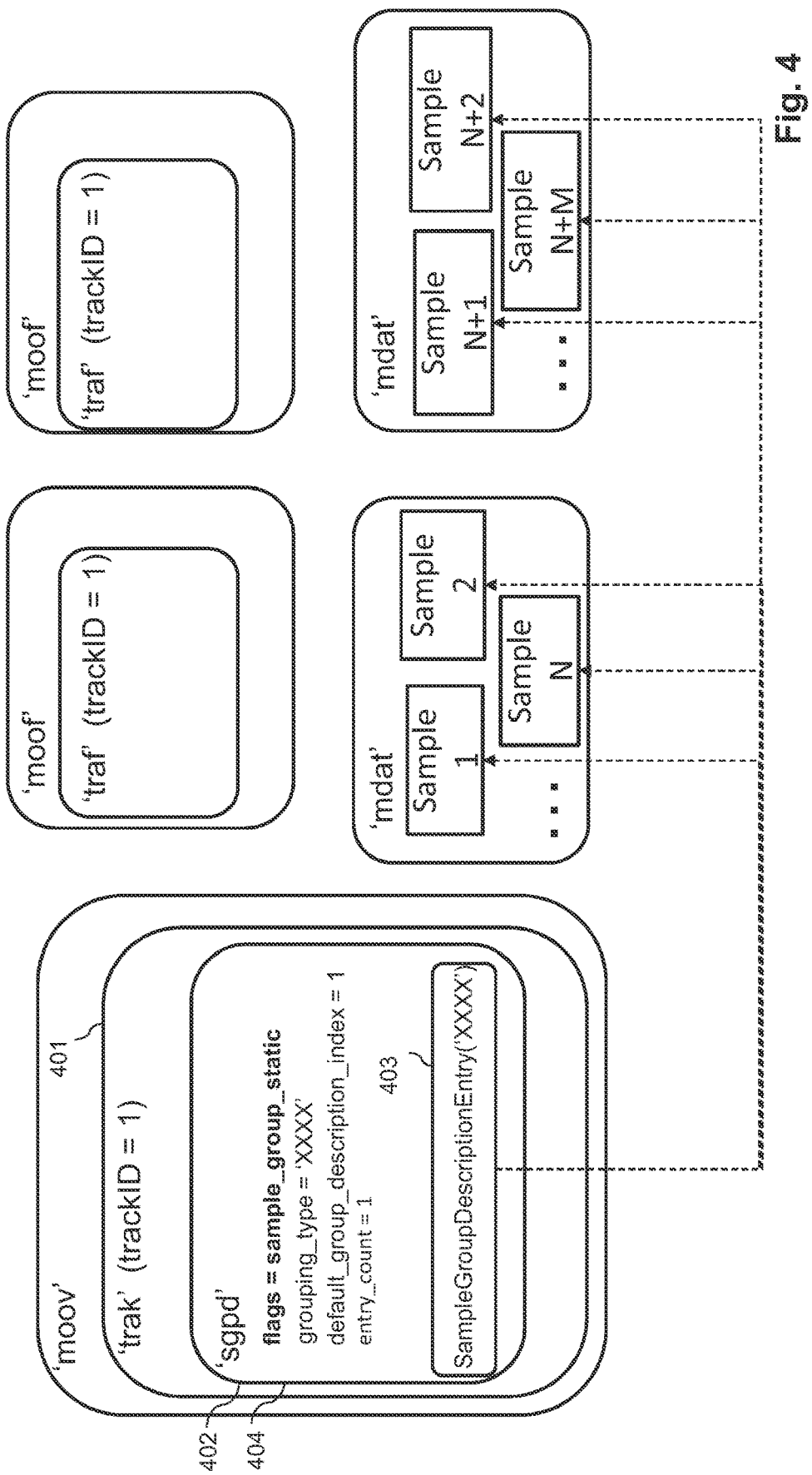
FIG. 4 illustrates an embodiment with a static sample grouping without NAL unit mapping.

In the FIG. 4, the grouping_type value 404 is illustrated with the value 'XXXX' but it may take any other four-character values corresponding to any kind of properties.

As an alternative, rather than defining flags for the SampleGroupDescriptionBox, the semantic of the box can be modified on the grouping_type value 404 basis. It is possible to mandate that if there is in a TrackBox ('trak') hierarchy of a fragmented media file a SampleGroupDescriptionBox with grouping_type equals to a given group type value, with version >=2 and default_group_description_index >0, then there shall not be any SampleToGroupBox with grouping_type equals to this given group type value for this track (including in any subsequent fragments). In such case, the SampleGroupDescriptionEntry 403 is static (i.e. invariant along time) for the whole track. Otherwise, the sample grouping may change for groups of samples over time. This alternative has the advantage to not change the existing SampleGroupDescriptionBox definition.

With above alternatives, it is not possible to signal that only the list of SampleGroupDescriptionEntry 403 is not changing over time while the sample group mapping may change over time (by defining a new SampleToGroupBox) but the default sample grouping assignment and the list of SampleGroupDescriptionEntry cannot be changed.

To solve this issue, a two-bit flag is defined (for instance in SampleGroupDescriptionBox'S flags) with the following values:

sample_group_static with the flag value 0x000001 and same semantic than above.

all_sample_group_description_static: indicates that this sample group description is restricted to be static and the list of SampleGroupDescriptionEntry and default sample group mapping (when present) is never modified. The flag value is 0x000002. When this flag is set, multiple entries may be present in the sample group description, SampleToGroupBox with same grouping_type may be present, and no SampleGroupDescriptionBox with same grouping_type should be present in subsequent track fragments or it shall have exactly the same BoxPayload. This means that the group description data structure is static (i.e. invariant along time) while the track samples composing the group may vary over time.

Other values are reserved.

In another alternative, a third value for the two-bit flag is defined to allow changing the default sample group mapping along time but still signalling that the list of SampleGroupDescriptionEntry is invariant along time. This third flag is defined as follows:

sample_group_description_list_static: indicates that the list of SampleGroupDescriptionEntry in this sample group description is restricted to be static. The flag value is 0x000003. When this flag is set, multiple entries may be present in the sample group description, SampleToGroupBox with same grouping_type may be present, and SampleGroupDescriptionBox with same grouping_type may also be present in subsequent track fragments. When SampleGroupDescriptionBox with same grouping_type is present in subsequent media fragment, the list of SampleGroupDescriptionEntry shall be exactly the same. This means that the group description data structure is static while a default sample group mapping may vary over time.

In another alternative, one single flag sample_group_static is defined as follows:

sample_group_static: indicates that this sample group is restricted to be static and never modified. The flag value is 0x000001. If a SampleGroupDescriptionBox with the same grouping_type is defined in subsequent track fragments, it shall have exactly the same BoxPayload. When this flag is set and a single entry is present in the sample group description, no SampleToGroupBox for this grouping type shall be present in this track or subsequent track fragments, and every sample in the track or subsequent track fragments is associated with the only defined sample group description entry. When this flag is set and several entries are present in the sample group description, the mapping of samples to sample group descriptions shall be done using the sampleToGroupBox mechanism, potentially using the default sample grouping mechanism.

In another alternative, sample_group_static, all_sample_group_description_static and sample_group_description_list_static values can be defined as individual 1-bit flag values.

When the invention is applied to the subpicture ID sample group (with grouping type 'spid' and sample group description entry VvcSubpicIDEntry as defined above, this sample group 'spid' may be present in VVC subpicture tracks that contain VVC subpictures. This sample group shall not be present in tracks that are not VVC subpicture tracks or do not contain VVC subpictures. Each sample group description entry indicates a list of one or more subpicture ID values in decoding order that are contained in samples mapped to this sample group description entry. When this sample group is used as a default sample group and the flag sample_group_static is set, all the samples in the track contain VVC subpictures with the indicated subpicture ID values."

When the VVC subpicture track is referenced by a VVC base track containing a 'spor' sample group description entry having subpic_id_info_flag equal to 1, the VVC subpicture track shall contain either a subpicture ID sample group or a subpicture ID default sample group. When a subpicture ID default sample group with the flag sample_group_static is present, all the samples contain VVC subpictures with the indicated subpicture ID values.

According to another aspect of the invention, sample grouping mechanism is useful to associate property descriptions with groups of samples or with each sample, but it may also be extended to allow associating property descriptions with group of subparts in samples.

Figure 3:
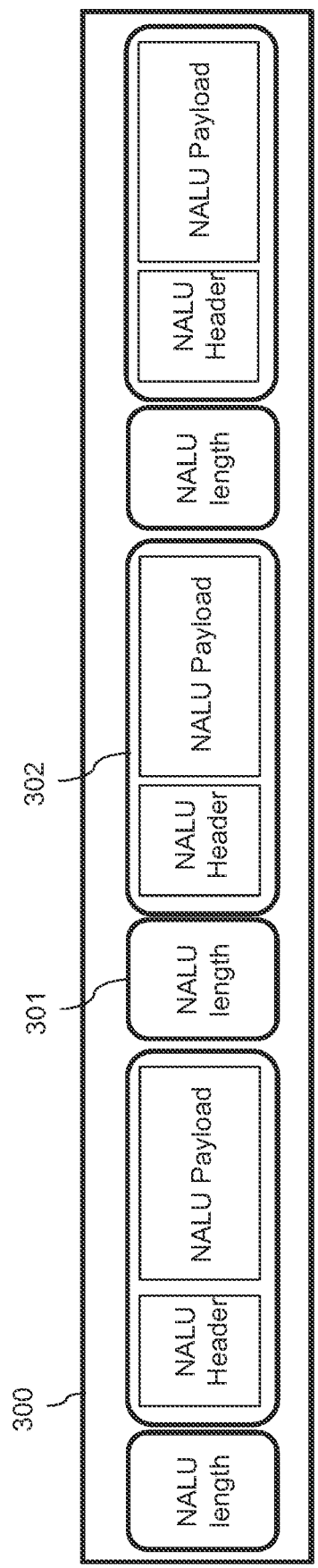
FIG. 3 illustrates a structure example of a video media sample according to ISO Base Media File Format.

FIG. 3 illustrates structure example of a media (video) sample 300 according to ISO Base Media File Format for video format based on NAL (Network Abstraction Layer) unit-based video encoding formats (e.g. for HEVC or VVC encoding formats).

A media sample is an audio/video data unit with a single time (e.g. an audio sample or a video frame). According to ISO/IEC 14496-15, a sample is a set of one or more NAL units 302 corresponding to an access unit or to a part of an access unit. Each NAL unit 302 is preceded by a NAL unit length field 301 providing the length in bytes of the NAL unit 302. For example, for single layer video, a sample corresponds to a coded picture. For layered video, a sample may correspond to a part of an access unit, for example to the NAL units for the base layer. For video encoded in HEVC, a sample may correspond to an access unit or a part of an access unit composed of slices, each slice being encapsulated into one or more NAL units. As another example, for VVC video containing subpictures (representing spatial rectangular subparts of a picture), a sample may correspond to one or more subpictures, each subpicture being composed of one or more NAL units 302.

ISOBMFF and its extensions comprise in file format for HEVC a mechanism based on the sample grouping mechanism to assign an identifier, called groupID, to each NAL unit. A sample group with grouping_type equal to 'nalm' is defined.

The SampleGroupDescriptionBox ('sgpd') with grouping_type equal to 'nalm' contains a list of NALUMapEntry (inherited from VisualSampleGroupEntry) defined as follows:

```
class NALUMapEntry( ) extends VisualSampleGroupEntry ('nalm') {
   bit(6) reserved = 0;
   unsigned int(1) large_size;
   unsigned int(1) rle;
   if (large_size) {
      unsigned int(16) entry_count;
   } else {
      unsigned int(8) entry_count;
   }
   for (i=1; i<= entry_count; i++) {
      if (rle) {
         if (large_size) {
            unsigned int(16) NALU_start_number;
         } else {
            unsigned int(8) NALU_start_number;
         }
      }
      unsigned int(16) groupID;
   }
}
``` where

NALU_start_number is the 1-based NAL unit index in the sample of the first NAL unit in the current run associated with groupID.

groupID specifies the unique identifier of the group. More information about the group is provided by the sample group description entry with this groupID and grouping_type equal to the grouping_type_parameter of the SampleToGroupBox of type 'nalm'

Hence, each NALUMapEntry provides a map of NAL units in a sample with the groupID assigned to each NAL unit.

The NALUMapEntry is therefore a data structure assigning the NAL units to one or more sample groups similarly to the SampleToGroup box.

The sampletoGroupBox with grouping type 'nalm' provides the index of the NALUMapEntry assigned to each group of samples and the grouping_type_parameter identifying the grouping_type of the SampleGroupDescriptionBox containing the semantic description with same groupID assigned to each NAL unit.

Additionally, we note that there is currently no way to identify the subpicture ID of NAL units in a sample of a track mixing several subpictures.

According to an embodiment, it is possible to reuse this NAL unit mapping mechanism in VVC file format, for example to associate each subpicture carried in a sample with its subpicture ID.

In a first alternative, it is possible to allow usage of NALUMapEntry with the 'spid' sample group. A 'spid' sample group description can be used together with a NALU map sample group to describe the subpicture IDs of NAL units within a sample. In this case, the groupID defined by the NALU map sample group description entry identifies the 1-based index of the sample group description entry of type 'spid' for that track. If groupID is not assigned or groupID has a value 0, this indicates that the subpicture IDs of the associated NAL units is unknown.

As an alternative, if groupID is not assigned or if groupID equals 0, this indicates that the subpicture IDs of NAL units not mapped to a groupID or mapped to the groupID with a value 0 are provided by the entry VvcSubpicIDEntry whose 1-based index is given by the default_group_description_index parameter of the SampleGroupDescriptionBox having the grouping_type 'spid'.

By default, when in a NALU mapping, NAL units are not assigned to a groupID or are assigned to groupID having the value 0. This indicates that the set of property values associated with those NAL units is provided by the SampleGroupDescriptionEntry identified by the 1-based index default_group_description_index in the SampleGroupDescriptionBox with a grouping_type equal to the grouping_type_parameter in a SampleToGroupBox with grouping_type 'nalm'. This default rule may be overridden by the semantics of the grouping_type indicated by the grouping_type_parameter of the SampleToGroupBox of type 'nalm'.

In a second alternative, an additional groupID parameter may be added to the sample group entry VvcSubpicIDEntry as follows:

```
aligned(8) class VvcSubpicIDEntry( ) extends
VisualSampleGroupEntry('spid')
{
   unsigned int(16) groupID;
   unsigned int(8) num_subpics_minus1;
   for (i = 0; i <= num_subpics_minus1; i++)
      unsigned int(16) subpic_id;
}
``` where subpic_id for loop counter i specifies the i-th subpicture identifier, in decoding order, contained in the sample mapped to this sample group description entry. groupID is a unique identifier for the subpicture IDs group described by this sample group entry. When there is SampleToGroupBox of type 'nalm' and grouping_type_parameter equal to 'spid', a SampleGroupDescriptionBox of type 'spid' shall be present, and the value of groupID in the entries of NALUMapEntry shall be equal to the groupID in one of subpicture IDs group entries.

Figure 5:
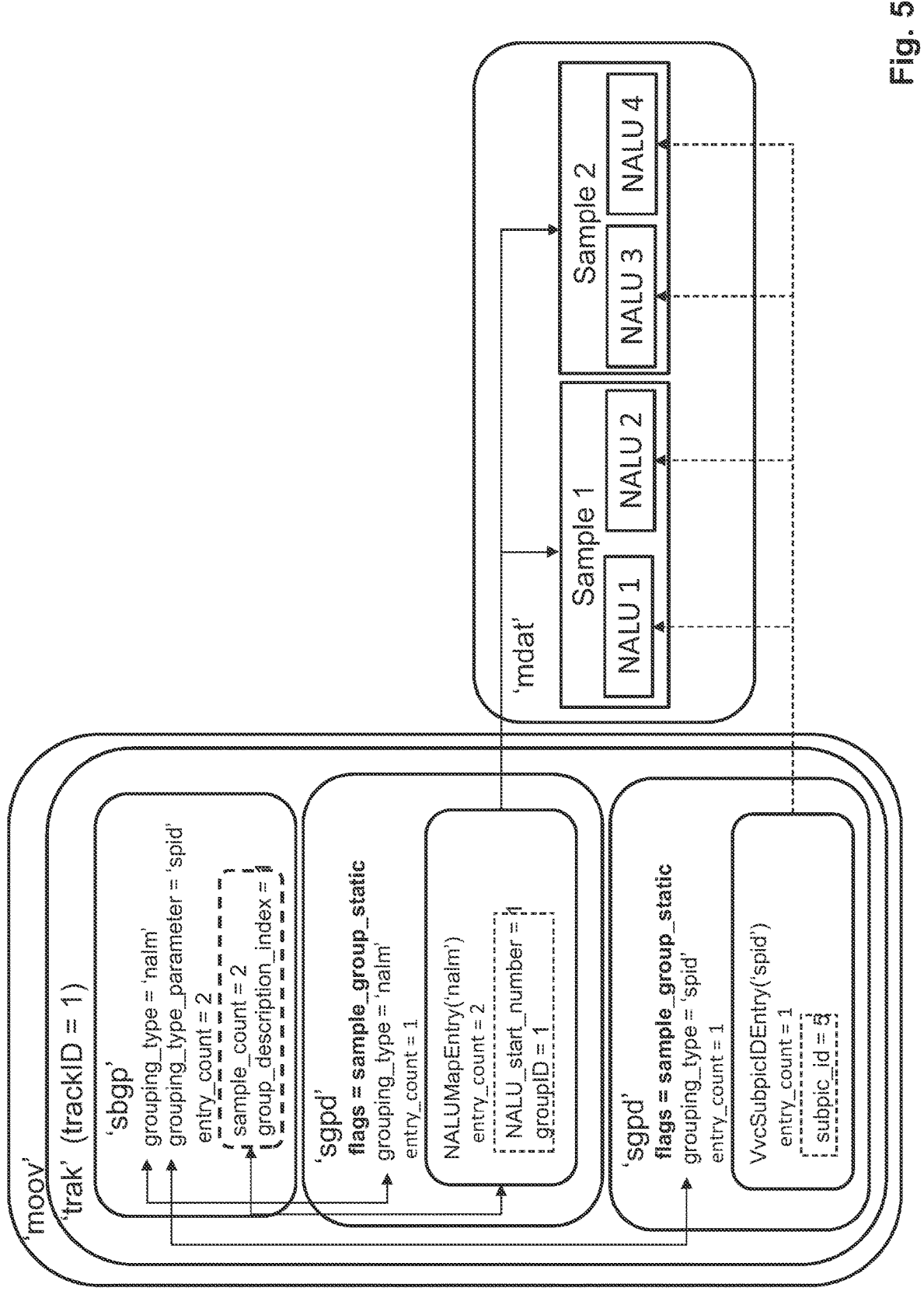
FIG. 5 illustrates an embodiment with a static sample grouping with a static NAL unit mapping.

It is also possible to combine the NAL unit mapping sample grouping with the static signalling described above as illustrated in FIG. 5.

When applied to NAL unit mapping sample grouping, the flags that signals the static property of the sample grouping (sample_group_static, all_sample_group_description_static or sample_group_description_list_static) can be set either on the SampleGroupDescriptionBox with grouping_type 'nalm' that describes the groups of NAL units within a sample or to the SampleGroupDescriptionBox that provides the sets of property values associated with each group of NAL units.

When any one of the new flags values sample_group_static, all_sample_group_description_static or sample_group_description_list_static is set to the SampleGroupDescriptionBox With grouping_type 'nalm', that means that the static property applies to the pattern of groups of NAL units within samples (i.e. the pattern of association of groupIDs with NAL units):

sample_group_static: indicates that the pattern of groups of NAL units within samples is restricted to be static and never modified. When this flags value is set in the SampleGroupDescriptionBox with grouping_type 'nalm', a single entry shall be present in the sample group description, a SampleToGroupBox with grouping_type 'nalm' is present, and every sample in the track or subsequent track fragments is associated with the only defined sample group description entry NALUMapEntry either explicitly via the group_description_index in a SampleToGroupBox with grouping_type 'nalm' or by default via the default_group_description_index in the SampleGroupDescriptionBox having grouping_type 'nalm'. If a SampleGroupDescriptionBox with the same grouping_type is defined in subsequent track fragments, it shall have exactly the same BoxPayload.

all_sample_group_description_static: indicates that the list of pattern descriptions of groups of NAL units within samples is restricted to be static and the list of SampleGroupDescriptionEntry and default sample group mapping (when present) is never modified. When this flags value is set in the SampleGroupDescriptionBox with grouping_type multiple NALUMapEntry entries may be present in the sample group description box, a (possibly several) SampleToGroupBox with grouping_type 'nalm' is present, and no SampleGroupDescriptionBox with same grouping_type should be present in subsequent track fragments or, if present, it shall have exactly the same BoxPayload. This means that the list of pattern descriptions of groups of NAL units within samples is static (i.e. invariant along time) while the association of track samples with a pattern description of groups of NAL units may vary over time.

sample_group_description_list_static: indicates that the list of pattern descriptions of groups of NAL units within samples is restricted to be static. When this flags value is set in the SampleGroupDescriptionBox with grouping_type 'nalm', multiple entries of type NALUMapEntry may be present in the sample group description box, a (possibly several) SampleToGroupBox with grouping_type 'nalm' is present, and SampleGroupDescriptionBox With same grouping_type may also be present in subsequent track fragments. When SampleGroupDescriptionBox with same grouping_type is present in subsequent media fragment, the list of entries of type NALUMapEntry shall be exactly the same. This means that the sample group description data structure is static while a default sample group mapping, when present, may vary over time.

When any one of the new flags values sample_group_static, all_sample_group_description_static or sample_group_description_list_static is set to the SampleGroupDescriptionBox with grouping_type equal to the grouping_type_parameter of the SampleToGroupBox with grouping_type 'nalm', that means that the static property applies to the description of the sets of properties values associated with the NAL units.

When flags values sample_group_static or all_sample_group_description_static are set in a SampleGroupDescriptionBox with a grouping_type equal to a given grouping_type_parameter of the SampleToGroupBox with grouping_type 'nalm' and when a SampleGroupDescriptionBox with a grouping_type equal to the same given grouping_type_parameter is present in a subsequent media fragment, it may exactly have the same BoxPayload (i.e. the list of SampleGroupDescriptionEntry and the default_group_description_index, when present, shall be exactly the same). This means that the sample group description data structure is static while the association of the SampleGroupDescriptionEntry with groups of NAL units may vary over time.

When flags value sample_group_description_list_static is set in a SampleGroupDescriptionBox With a grouping_type equal to a given grouping_type_parameter of the SampleToGroupBox with grouping_type 'nalm' and when a SampleGroupDescriptionBox with a grouping_type equal to the same given grouping_type_parameter is present in subsequent media fragments, the list of SampleGroupDescriptionEntry may exactly be the same. This means that the group description data structure is static while the association of the SampleGroupDescriptionEntry with groups of NAL units may vary over time.

Additionally, we note that there is currently no way to identify the coordinates (horizontal and vertical offsets in luma pixels) and the size (width and height in luma pixels) of a rectangular region composed of NAL units (representing subpictures or slices) in a VVC sample.

According to an embodiment, the NAL unit mapping can be used with the TileRegionGroupEntry defined in ISO/IEC 14496-15 as follows:

A rectangular spatial region can be composed of either of the following:

A sequence of one or more VVC subpictures that are contiguous in decoding order.

A sequence of one or more complete slices that forms a rectangular area and that are that are contiguous in decoding order.

A rectangular spatial region covers a rectangle without holes. Rectangular spatial regions within a picture do not overlap with each other.

Rectangular spatial regions can be described through rectangular spatial region visual sample group description entries (i.e., instances of TileRegionGroupEntry) with tile_region_flag equal to 1.

If each sample of a track consists of NAL units of only one rectangular spatial region, SampleToGroupBox of type 'trif' can be used to associate samples to the rectangular spatial region, but this SampleToGroupBox of type 'trif' can be omitted if the default sample grouping mechanism is used (i.e., when the version of the SampleGroupDescriptionBox of type 'trif' is equal to or greater than 2). Otherwise, samples, NAL units, and rectangular spatial regions are associated with each other through SampleToGroupBoxes of type 'nalm' and grouping_type_parameter equal to 'trif' and SampleGroupDescriptionBox of type 'nalm'. A TileRegionGroupEntry describes:
- a rectangular spatial region,
- coding dependencies between this rectangular spatial region and other rectangular spatial regions.

Each TileRegionGroupEntry is assigned a unique identifier, called groupID. This identifier can be used to associate NAL units in a sample to a particular TileRegionGroupEntry.

Positioning and size of rectangular spatial regions are identified using luma sample coordinates.

When used with movie fragments, TileRegionGroupEntry can be defined for the duration of the movie fragment, by defining a new SampleGroupDescriptionBox in the track fragment box. However, there shall not be any TileRegionGroupEntry in a track fragment that has the same groupID as a TileRegionGroupEntry already defined.

NAL units mapped to a rectangular spatial region may either be carried in a VVC track, as usual, or in a separate track called VVC subpicture track.

Similarly, to the signaling of subpicture IDs with the sample grouping 'spid' with or without the use of a NAL units mapping sample grouping 'nalm', the static signaling in SampleGroupDescriptionBox can also be used in combination with the Tile Region sample grouping 'trif' or another similar sample grouping type providing characteristics of a rectangular region (position, size, coding properties and/or dependencies with other rectangular regions) to signal rectangular region that does not vary over time.

In an alternative embodiment, above approaches to signal the subpicture IDs associated with NAL units could be further simplified by defining a virtual sample grouping type for subpictures, and mapping the groupID to subpicture ID plus one. This would avoid carrying a sample group description.

According to this embodiment, an information in the grouping data structure indicates that the group is a virtual group. Depending on the type of the virtual group, a property value is associated within the grouping data structure to the elements of the group. Accordingly, a property value may be associated without the need of a group description box embedding the property in addition to the grouping data structure.

According to this embodiment, a new "virtual" sample group with grouping type 'spid' or with another new four-character value, e.g. 'spix', is defined. A "virtual" sample group is a sample group for which there is no associated SampleGroupDescriptionBox and SampleGroupDescriptionEntry. Each set of property values describing a "virtual" sample group can only be stored as a single 32-bit length value. For example, a set of property values of a "virtual" sample group is composed of two property values, each property value being encoded as a 16-bit length value, or as one 8-bit length and one 24-bit length values. A set of property values describing a "virtual" sample group can be composed of any number of property values as long as the sum of property value's lengths in bits doesn't exceed 32-bits.

Figure 7:
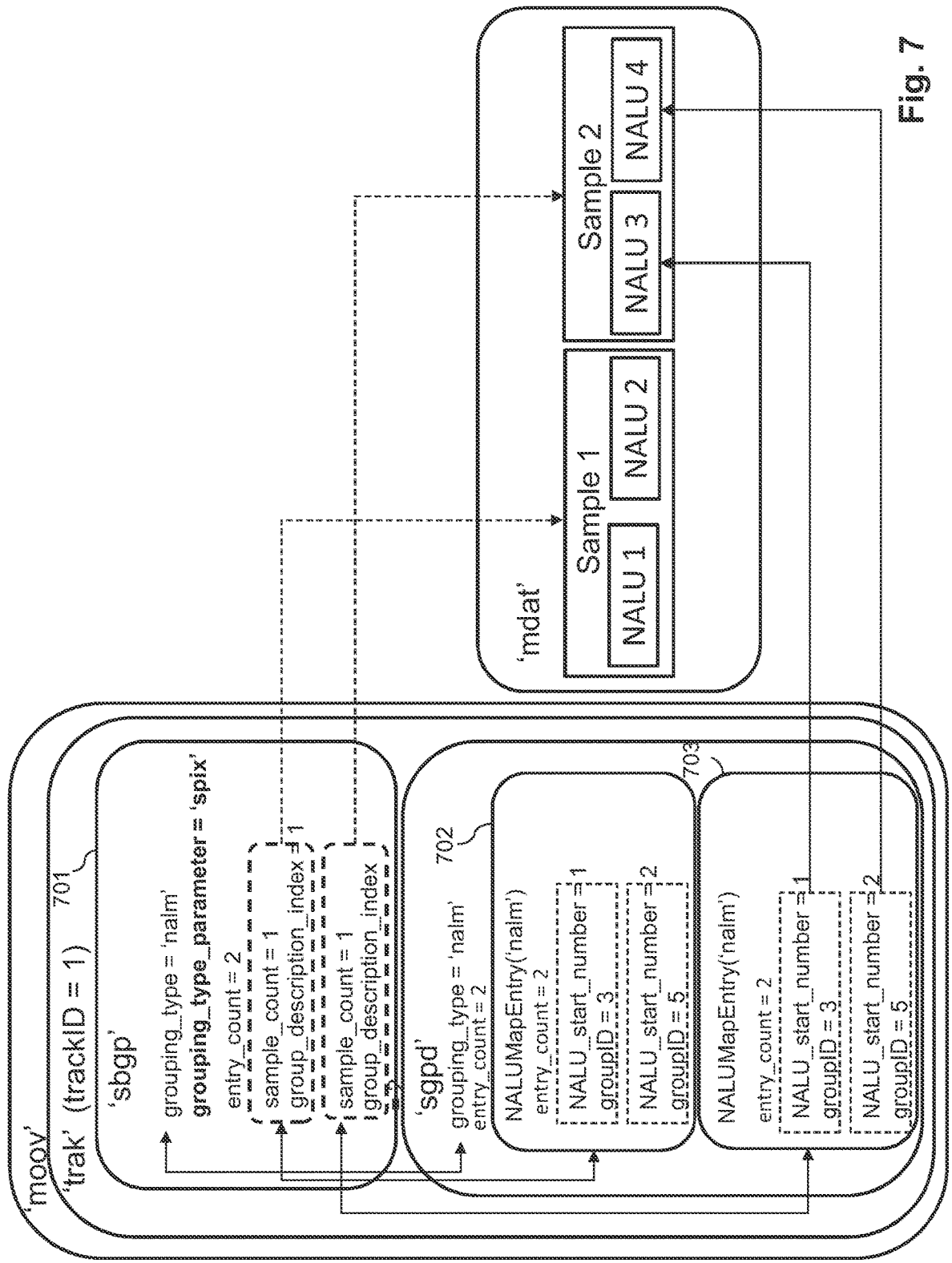
FIG. 7 illustrates an embodiment with a virtual sample grouping with NAL unit mapping.

As illustrated in FIG. 7, when a SampleToGroupBox of grouping_type 'nalm' 701 contains a grouping_type_parameter equal to the virtual sample group type 'spid' or 'spix', the groupID in NALUMapEntry 702 and 703 in the SampleGroupDescriptionBox with grouping_type 'nalm' directly provides the subpicture ID value plus one associated with the NAL unit(s) mapped to this groupID. In the example illustrated by FIG. 7, the NAL unit 3 is mapped to the subpicture with ID value 3, and the NAL unit 4 is mapped to the subpicture ID value 5. In such case, it means there is no need to define a SampleGroupDescriptionBox with grouping_type equal to 'spid' or 'spix'.

In an alternative, flags of the SampleToGroupBox are used to signal that grouping_type_parameter contains the grouping_type value of a virtual sample group. The flags value is defined as follows:

is_virtual_sample_group: indicates that the grouping_type_parameter shall be interpreted as a group type of a virtual sample group. The flags value is 0x000001. When this flags value is set, no SampleGroupDescriptionBox with grouping_type equal to grouping_type_parameter shall be present. The semantic of the groupID in NALUMapEntry associated with samples in this SampleToGroupBox is defined by the semantic of the virtual sample group identified by the grouping_type_parameter.

According to the invention, the virtual sample group signalling can be advantageously combined with the static sample grouping signalling. For instance, if the SampleGroupDescriptionBox with grouping_type 'nalm' is signalled as static by setting the box's flags value sample_group_static, the parser is informed that the list of patterns of groups of NAL units within samples is invariant along time, i.e. the pattern of group of NAL units is the same for all samples of the track, each NAL unit in the pattern being associated with one given property value of a virtual sample group directly in the groupID parameters of the NALUMapEntry in SampleGroupDescriptionBox with grouping_type 'nalm'.

Figure 6:
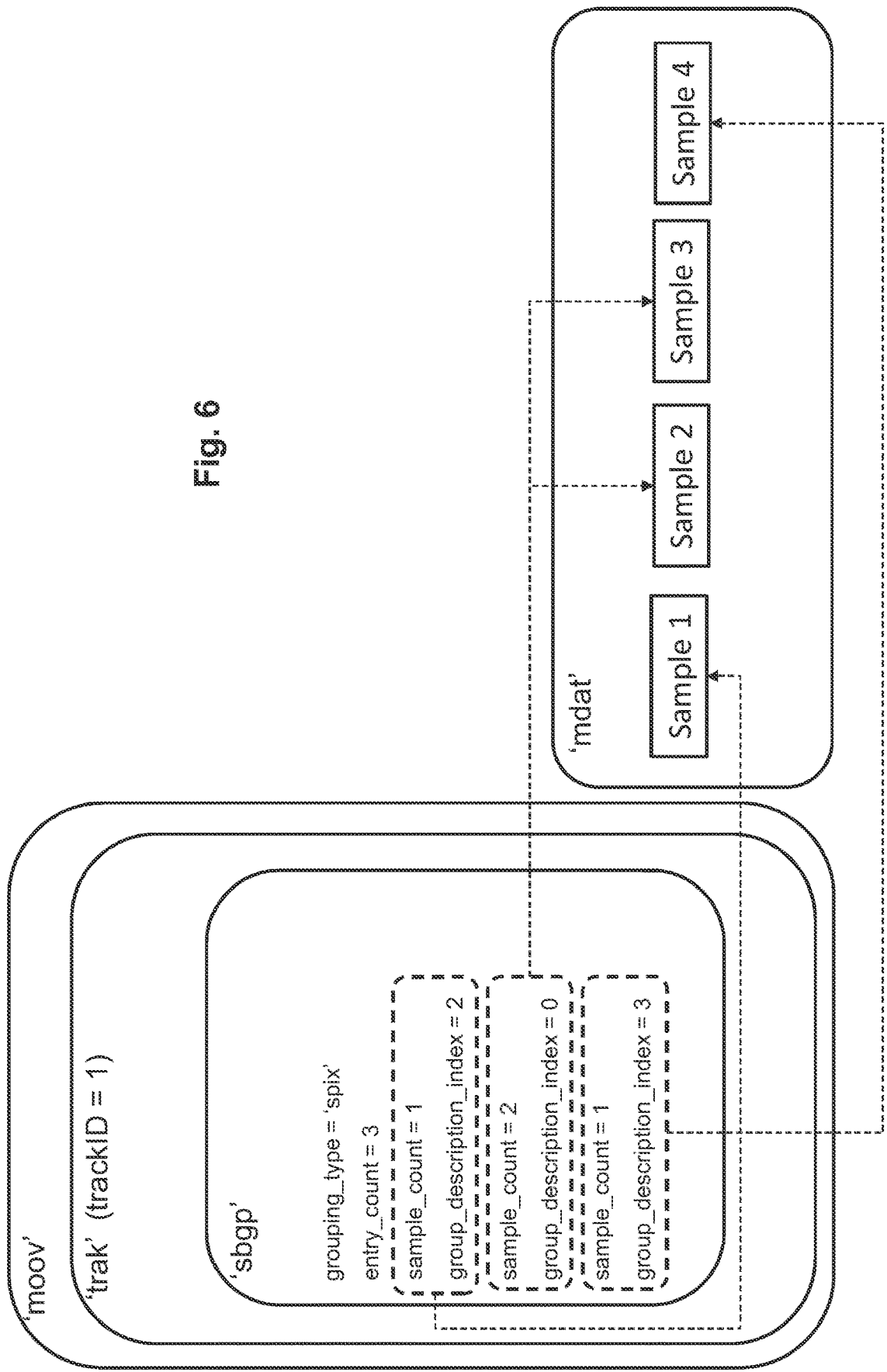
FIG. 6 illustrates an embodiment with a virtual sample grouping without NAL unit mapping.

According to the invention, the notion of "virtual" sample group can also be useful when there is no NAL units mapping as illustrated in FIG. 6. Similarly, when a set of property values (corresponding to an entry) associated by a sample grouping with groups of samples can be coded on a single value representing the entire set of property values in the entry, and this single value does not exceed 32-bits, it is possible not to declare the SampleGroupDescriptionBox associated with a SampleToGroupBox with same grouping_type. In this case, only the SampleToGroupBox with the grouping type corresponding to the "virtual" sample group is declared (e.g. the grouping_type 'spix' on the FIG. 6) and the group_description_index directly provides the 32-bit value corresponding to the set of property values associated with the samples. For instance, on FIG. 6, the group_description_index with the value 2 in the first entry indicates that samples associated with this entry have the subpicture ID equal to 2. In an alternative, flags of the SampleToGroupBox are used to signal that either grouping_type_parameter contains the grouping_type value of a virtual sample group, or group_description_index contains the property values associated with the group of samples. The flags value is defined as follows:

is_virtual_sample_group: indicates whether the SampleToGroupBox is referring to a virtual sample group. The flags value is 0x000001:

When this flag is set and grouping_type is equal to 'nalm' (i.e. this is a NAL unit mapping), the grouping_type_parameter shall be interpreted as a group type of a virtual sample group. No SampleGroupDescriptionBox With grouping_type equal to grouping_type_parameter shall be present. The semantic of the groupID in NALUMapEntry associated with samples in this SampleToGroupBox is defined by the semantic of the virtual sample group identified by the grouping_type_parameter.

When this flag is set and grouping_type is not equal to 'nalm' (i.e. this is not a NAL unit mapping), the semantic of the group_description_index is defined by the semantic of the virtual sample group identified by the grouping_type. No SampleGroupDescriptionBox With grouping_type equal to SampleToGroupBox's grouping_type shall be present.

According to another aspect, NAL unit mapping mechanism is used in VVC file format to describe rectangular spatial regions carried into a VVC bitstream.

Rectangular spatial regions in VVC are composed of either of the following:
  A sequence of one or more VVC subpictures that are contiguous in decoding order.
  A sequence of one or more complete slices that forms a rectangular area and that are that are contiguous in decoding order.

A rectangular spatial region covers a rectangle without holes. Rectangular spatial regions within a picture do not overlap with each other.

Rectangular spatial regions can be described through rectangular spatial region visual sample group description entries (i.e., instances of VvcRectSpatialRegionGroupEntry). This descriptor does not allow indicating whether the rectangular spatial region is composed of slices or subpicture. In the case where the rectangular spatial region is composed of subpicture, the descriptor does not allow indicating the subpicture identifiers associated with the subpictures composing the rectangular spatial region.

According to a third aspect, it is proposed to improve the descriptor describing a rectangular spatial region to introduce a "has_subpictures" parameter indicating whether the rectangular spatial region is composed of slices or subpictures. In an advantageous embodiment, in case the "has_subpictures" parameter indicates that the rectangular spatial region is composed of subpictures, the descriptor is provided with the list of the subpicture identifiers of the subpictures composing the rectangular spatial region.

If each sample of a track consists of NAL units of only one rectangular spatial region, SampleToGroupBox of type 'vrsr' can be used to associate samples to the rectangular spatial region, but this SampleToGroupBox of type 'vrsr' can be omitted if the default sample grouping mechanism is used (i.e., when the version of the SampleGroupDescriptionBox of type 'vrsr' is equal to or greater than 2). Otherwise, samples, NAL units, and rectangular spatial regions are associated with each other through SampleToGroupBoxes of type 'nalm' and grouping_type_parameter equal to 'vrsr' and SampleGroupDescriptionBox of type 'nalm'. A VvcRectSpatialRegionGroupEntry describes:
  a rectangular spatial region,
  coding dependencies between this rectangular spatial region and other rectangular spatial regions, and,
  a list of one or more subpicture ID values when VVC subpictures are present.

Each VvcRectSpatialRegionGroupEntry is assigned a unique identifier, called groupID. This identifier can be used to associate NAL units in a sample to a particular VvcRectSpatialRegionGroupEntry.

Positioning and size of rectangular spatial regions are identified using luma sample coordinates.

When used with movie fragments, VvcRectSpatialRegionGroupEntry can be defined for the duration of the movie fragment, by defining a new SampleGroupDescriptionBox in the track fragment box as defined in clause 8.9.4 of ISO/IEC 14496-12. However, there shall not be any VvcRectSpatialRegionGroupEntry in a track fragment that has the same groupID as a VvcRectSpatialRegionGroupEntry already defined.

NAL units mapped to a rectangular spatial region may either be carried in a VVC track, as usual, or in a separate track called VVC subpicture track.

Rectangular Spatial Region sample group is defined as follows:

Rectangular Spatial Region sample group may be present in tracks that contain VVC subpictures or group of slices forming a rectangular area and contiguous in decoding order. Each sample group description entry indicates a rectangular spatial region, and coding dependencies between this rectangular spatial region and other rectangular spatial regions. When subpictures are present, it also indicates a list of one or more subpicture ID values in decoding order.

```
aligned(8) class VvcRectSpatialRegionGroupEntry( ) extends
VisualSampleGroupEntry('vrsr')
{
  unsigned int(16) groupID;
  unsigned int(1) rect_region_flag;
  if (!rect_region_flag)
  {
    bit(7) reserved = 0;
  }
  else {
    unsigned int(2) independent_idc;
    unsigned int(1) full_picture;
    unsigned int(1) filtering_disabled;
    unsigned int(1) has_dependency_list;
    unsigned int(1) has_subpictures;
    bit(1) reserved = 0;
    if (!full_picture) {
      unsigned int(16) horizontal_offset;
      unsigned int(16) vertical_offset;
    }
    unsigned int(16) region_width;
    unsigned int(16) region_height;
    if (has_subpictures) {
      unsigned int(8) num_subpics_minus1;
      for (i = 0; i <= num_subpics_minus1; i++)
        unsigned int(16) subpic_id;
    }
    if (has_dependency_list) {
      unsigned int(16) dependency_region_count;
      for (i=1; i<= dependency_region_count; i++)
        unsigned int(16) dependencyRectSpatialRegionGroupID ;
  }
}
``` where
  groupID is a unique identifier for the rectangular spatial region group described by this sample group entry. The value of groupID in a rectangular spatial region group entry shall be greater than 0. The value 0 is reserved for a special use.

When there is SampleToGroupBox of type 'nalm' and grouping_type_parameter equal to 'vrsr', a SampleGroupDescriptionBox of type 'vrsr' shall be present, and the following applies:
  The value of groupID in a spatial region group entry shall be equal to the groupID in one of the entries of NALUMapEntry.
  A NAL unit being mapped to groupID 0 by a NALUMapEntry implies that the NAL unit is required for decoding any rectangular spatial region in the same coded picture as this NAL unit.

There can be multiple rectangular spatial region group entries with the same values of horizontal_offset, vertical_offset, region_width and region_height, respectively, but with different groupID values, for describing varying dependencies.

When a multi-layer bitstream is carried in one or more tracks, for any two layers layerA and layerB of the bitstream, the following constraint applies: When a NAL unit of layerA is associated with a groupID value gIdA and a NAL unit of layerB is associated with a groupID value gIdB, gIdA shall not be equal to gIdB.

has_subpictures equal to 0 specifies that the region covered by the NAL units within a picture and associated with this rectangular spatial region group entry is a region composed of one or more complete slices as specified in ISO/IEC 23090-3 that form a rectangular area and are contiguous in decoding order. The value 1 specifies that the region covered by the NAL units within a picture and associated with this rectangular spatial region group entry is a region composed of one or more complete subpictures as specified in ISO/IEC 23090-3 that are contiguous in decoding order.

independent_idc specifies the coding dependencies between each rectangular spatial region associated with this rectangular spatial region group entry and other rectangular spatial regions in the same picture or in reference pictures of the same layer. Inter-layer dependencies, if any, are indicated by a list of dependencyRectSpatialRegionGroupID (when has_dependency_list is equal to 1).

This field takes the following values:
- If independent_idc equals 0, the coding dependencies between this rectangular spatial region and other rectangular spatial regions in the same picture or in reference pictures of the same layer is either described by a list of dependencySpatialRegionGroupID (when has_dependency_list is equal to 1) or unknown (when has_dependency_list is equal to 0).
- If independent_idc equals 1, there are no temporal dependencies between this rectangular spatial region and the rectangular spatial regions with different groupID in any reference pictures of the same layer but there can be coding dependencies between this rectangular spatial region and a rectangular spatial region with the same groupID in a reference picture of the same layer.
- If independent_idc equals 2, there are no coding dependencies between this rectangular spatial region and any rectangular spatial region in a reference picture of the same layer.
- The value 3 is reserved.

full_picture, when set, indicates that each rectangular spatial region associated with this rectangular spatial region group entry is a complete picture, in which case region_width and region_height shall be set to the width and height, respectively, of the complete picture, and independent_idc shall be set to 1 or 2.

filtering_disabled, when set, indicates that for each rectangular spatial region associated with this rectangular spatial region group entry the in-loop filtering operation does not require access to pixels adjacent to this rectangular spatial region, i.e., bit-exact reconstruction of the rectangular spatial region is possible without decoding the adjacent rectangular spatial regions.

has_dependency_list, when set to 1, indicates that dependency_region_count and, when dependency_region_count is greater than 0, a list of dependencyRectSpatialRegionGroupID are present. When set to 0, dependency_region_count is not present and no dependencyRectSpatialRegionGroupID is present.

has_subpictures, when set to 1, indicates that the rectangular spatial region is composed of VVC subpictures and a list of subpicture IDs subpic_id is present. When set to 0, no list of subpicture IDs subpic_id is present horizontal_offset and vertical_offset give respectively the horizontal and vertical offsets of the top-left pixel of the rectangular region that is covered by the slices in each rectangular region associated with this rectangular spatial region group entry, relative to the top-left pixel of the base region, in luma samples. For VVC tracks and VVC subpictures tracks as defined in this part of ISO/IEC 14496-15, the base region used in the VvcRectSpatialRegionGroupEntry is the picture to which the slices in a region associated with this rectangular spatial region group entry belongs.

region_width and region_height give respectively the width and height of the rectangular region that is covered by the slices in each rectangular region associated with this rectangular spatial region group entry, in luma samples.

For VVC streams using spatial scalability and rectangular spatial regions on both the base and enhancement layers, when each layer is carried in its own track, the VvcRectSpatialRegionGroupEntry sample descriptions of the base layer will give coordinates expressed in luma samples of the base layer, while the VvcRectSpatialRegionGroupEntry sample descriptions of an enhancement layer will give coordinates expressed in luma samples of the enhancement layer.

num_subpics_minus1 plus 1 specifies the number of VVC subpictures contained in the sample region or sample mapped to this sample group description entry.

subpic_id for loop counter i specifies the i-th subpicture identifier, in decoding order, contained in the sample region or sample mapped to this sample group description entry.

dependency_region_count indicates the number of rectangular spatial regions each rectangular spatial region associated with this rectangular spatial region group entry depends on.

dependencyRectSpatialRegionGroupID gives the groupID of a rectangular spatial region (as defined by a VvcRectSpatialRegionGroupEntry) that this rectangular spatial region depends on. For a particular rectangular region associated with this rectangular spatial region group entry, the rectangular spatial regions it depends on may be from the same layer or the reference layers.

Figure 8:
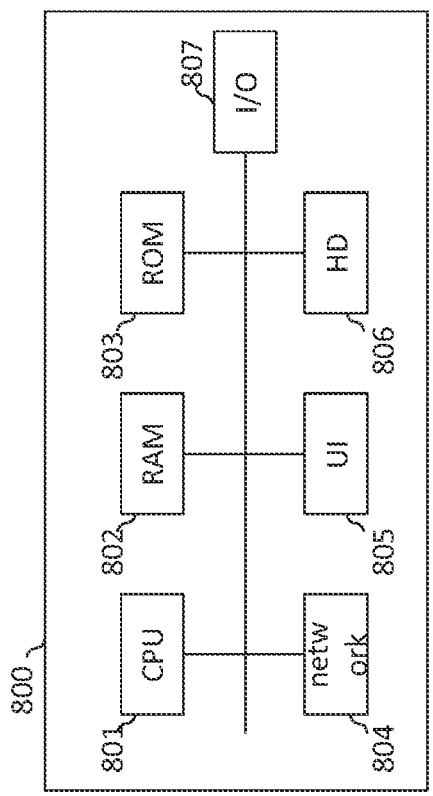
FIG. 8 is a schematic block diagram of a computing device for implementation of one or more embodiments of the invention.

FIG. 8 is a schematic block diagram of a computing device 800 for implementation of one or more embodiments of the invention. The computing device 800 may be a device such as a micro-computer, a workstation or a light portable device. The computing device 800 comprises a communication bus connected to:
- a central processing unit (CPU) 801, such as a microprocessor;
- a random access memory (RAM) 802 for storing the executable code of the method of embodiments of the invention as well as the registers adapted to record variables and parameters necessary for implementing the method for reading and writing the manifests and/or for encoding the video and/or for reading or generating data under a given file format, the memory capacity thereof can be expanded by an optional RAM connected to an expansion port for example;
- a read only memory (ROM) 803 for storing computer programs for implementing embodiments of the invention;
- a network interface 804 that is, in turn, typically connected to a communication network over which digital data to be processed are transmitted or received. The network interface 804 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 801;

a user interface (UI) 805 for receiving inputs from a user or to display information to a user;

a hard disk (HD) 806;

an I/O module 807 for receiving/sending data from/to external devices such as a video source or display.

The executable code may be stored either in read only memory 803, on the hard disk 806 or on a removable digital medium such as for example a disk. According to a variant, the executable code of the programs can be received by means of a communication network, via the network interface 804, in order to be stored in one of the storage means of the communication device 800, such as the hard disk 806, before being executed.

The central processing unit 801 is adapted to control and direct the execution of the instructions or portions of software code of the program or programs according to embodiments of the invention, which instructions are stored in one of the aforementioned storage means. After powering on, the CPU 801 is capable of executing instructions from main RAM memory 802 relating to a software application after those instructions have been loaded from the program ROM 803 or the hard-disc (HD) 806 for example. Such a software application, when executed by the CPU 801, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

For example, the present invention may be embedded in a device like a camera, a smartphone, a head-mounted display or a tablet that acts as a remote controller for a TV or for multimedia display, for example to zoom in onto a particular region of interest. It can also be used from the same devices to have personalized browsing experience of a multimedia presentation by selecting specific areas of interest. Another usage from these devices and methods by a user is to share with other connected devices some selected sub-parts of his preferred videos. It can also be used with a smartphone or tablet to monitor what happens in a specific area of a building put under surveillance provided that the surveillance camera supports the method for providing data according to the invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

The invention claimed is:

1. A method of generating a media file from a timed sequence of media data comprising samples, the method comprising:

generating a track comprising at least one of the samples;

generating a first data structure comprising data for describing each of one or more groups of samples in the track, the first data structure comprising a first grouping type, wherein the first data structure comprises data for indicating whether another first data structure with the same first grouping type is present in a subsequent fragment of the track; and generating a media file including the track and the first data structure, for streaming via a communication network, or for storage on a computing device.

2. The method of claim 1, wherein the method further comprises:

generating a second data structure assigning a subset of samples or subsamples of the track or a subsequent fragment of the track to the one or more groups of samples, the second data structure comprising a second grouping type; and including the second data structure in the generated media file.

3. The method of claim 2, wherein the first and second grouping types indicate a same grouping type value.

4. The method of claim 2, wherein:

the second data structure is a sample to group box.

5. The method of claim 1, wherein:

the data for indicating whether another first data structure with same first grouping type is present in a subsequent fragment of the track comprises one or more flags.

6. The method of claim 1, wherein:

the data for describing each of the one or more groups of samples comprises at least one set of one or more properties values; and the data for indicating whether another first data structure with same first grouping type is present in a subsequent fragment of the track further indicates whether the one or more groups of samples are mapped to a default set of the at least one set of properties values or are mapped to any one of the at least one set of properties values.

7. The method of claim 6, wherein:

if the data for indicating has a first value, the data for indicating indicates that another first data structure with same first grouping type can be present in a subsequent fragment of the track and that the one or more groups of samples are mapped to a default set of properties values of the at least one set of properties values and this mapping to a default set of the at least one set of properties values can change in a subsequent fragment of the track.

8. The method of claim 6, wherein:

if the data for indicating has a second value, the data for indicating indicates that another first data structure with same first grouping type is not present in a subsequent fragment of the track and the one or more groups of samples are mapped to any one of the at least one set of properties values.

9. The method of claim 6, wherein:

if the data for indicating has a third value, the data for indicating indicates that another first data structure with same first grouping type is not present in a subsequent fragment of the track and all samples are mapped to the default set of the at least one set of properties values.

10. The method of claim 2, wherein:

the second data structure is a sample group description box with grouping type 'nalm' and the first grouping type is equal to the grouping type parameter of a sample to group box.

11. A non-transitory computer-readable storage medium storing instructions of a computer program for implementing a method according to claim 1.

12. A device for generating a media file from a timed sequence of media data comprising samples, the device comprising:
- a memory device that stores a set of instructions; and
- at least one processor that executes the set of instructions to perform the following steps:
- generating a track comprising at least one of the samples;
- generating a first data structure comprising data for describing each of one or more groups of samples in the track, the first data structure comprising a first grouping type, wherein the first data structure comprises data for indicating whether another first data structure with same first grouping type is present in a subsequent fragment of the track; and
- generating a media file including the track and the first data structure, for streaming via a communication network, or for storage on a computing device.

13. A device for generating a media file from a timed sequence of media data comprising samples, the device comprising:
- a memory device that stores a set of instructions; and
- at least one processor that executes the set of instructions to perform the following steps:
- generating a track comprising at least one of the samples;
- generating a first data structure assigning a subset of samples or subsamples of the track to one or more groups of samples; and
- generating a media file including the track, the samples, and the first data structure;
- wherein:
- the first data structure comprises data indicating, when set to a first value, that a group description index value associated with each group of samples in the first data structure is an index of a set of one or more property values in a second data structure, and when set to a second value, that the group description index value associated with each group of samples in the first data structure contains one or more property values.

14. A method of parsing a media file encapsulating a timed sequence of media data comprising samples, the method comprising:
- obtaining a track comprising at least one of the samples on a computing device;
- parsing a first data structure comprising data for describing each of one or more groups of samples in the track, the first data structure comprising a first grouping type, wherein the first data structure comprises data for indicating whether another first data structure with same first grouping type is present in a subsequent fragment of the track; and
- retrieving the media data based on the data for indicating whether another first data structure with same first grouping type is present in a subsequent fragment of the track.

15. A method of generating a media file from timed sequence of media data comprising samples, the method comprising:
- generating a track comprising at least one of the samples;
- generating a first data structure assigning a subset of samples or subsamples of the track to one or more groups of samples; and
- generating a media file including the track, the samples, and the first data structure, for streaming via a communication network, or for storage on a computing device;
- wherein:
- the first data structure comprises data indicating, when set to a first value, that a group description index value associated with each group of samples in the first data structure is an index of a set of one or more property values in a second data structure, and when set to a second value, that the group description index value associated with each group of samples in the first data structure contains one or more property values.

16. The method of claim 15, wherein the indicating data is a grouping type value in the first data structure.

17. The method of claim 15, wherein the indicating data is a parameter within the first data structure.

18. The method of claim 15, wherein the method further comprises:
- generating a second data structure comprising data for describing each of the one or more groups of samples;
- wherein:
- each sample of the subset comprises one or more NAL units;
- the first and second data structures comprise a same grouping type value indicating a mapping between a subset of samples and data describing groups of one or more NAL units;
- a grouping type parameter value in the first data structure identifies a property;
- the indicating data indicates whether a group identifier value in data describing each group of one or more NAL units in the second data structure comprises one or more property values for the identified property or is an index of a set of one or more property values in a third data structure.

19. The method of claim 18, wherein the indicating data is the grouping type parameter value in the first data structure.

20. The method of claim 18, wherein the indicating data is a flag of the first data structure.

21. A device for parsing a media file encapsulating a timed sequence of media data comprising samples, the device comprising:
- a memory device that stores a set of instructions; and
- at least one processor that executes the set of instructions to perform the following steps:
- obtaining a track comprising at least one of the samples;
- parsing a first data structure comprising data for describing each of one or more groups of samples in the track, the first data structure comprising a first grouping type, wherein the first data structure comprises data for indicating whether another first data structure with same first grouping type is present in a subsequent fragment of the track; and
- retrieving the media data based on the data for indicating whether another first data structure with same first grouping type is present in a subsequent fragment of the track.

* * * * *